July 2, 1968  S. A. TATUM  3,390,614
ELECTROHYDRAULIC SERVOCONTROL SYSTEM
Filed June 23, 1967  3 Sheets-Sheet 1

INVENTOR.
SAMUEL A. TATUM
BY
*Shoemaker and Mattare*
ATTORNEYS

July 2, 1968  S. A. TATUM  3,390,614
ELECTROHYDRAULIC SERVOCONTROL SYSTEM
Filed June 23, 1967  3 Sheets-Sheet 3

INVENTOR.
SAMUEL A. TATUM
BY
*Shoemaker and Mattare*
ATTORNEYS

United States Patent Office 3,390,614
Patented July 2, 1968

3,390,614
ELECTROHYDRAULIC SERVOCONTROL
SYSTEM
Samuel A. Tatum, Newport News, Va., assignors to Newport News Shipbuilding and Dry Dock Company, Newport News, Va., a corporation of Virginia
Filed June 23, 1967, Ser. No. 648,426
10 Claims. (Cl. 91—364)

ABSTRACT OF THE DISCLOSURE

A servosystem for controlling the position of a mechanical device, such as a rudder or a diving plane according to commands from a helm, the illustrated system having an electrical command circuit controlling hydraulic ram means and having an electrical follow-up circuit feeding back into the command circuit for sensing the closeness with which the ram is following the command, and the system including means for comparing signals representing the rate of follow-up by the ram with signals representing the command, for the purpose of determining an emergency condition occasioned by an excessive lag of the ram displacement behind the command. The present improvement comprises means for preshaping the sample signals delivered to the comparing means, which signals respectively represent the ram velocity and the command signal, so that they will resemble idealized wave shapes which can be properly compared to discern significant discrepancies attributable to failure of the ram to adequately follow the command, rather than being attributable to failure of the compared signals to accurately represent the response of the ram to the command.

Disclosure

This invention relates to improvements in servocontrol systems of the type employing an hydraulic ram, controlled by a servo valve, which is in turn controlled by an electrical system developing an error signal representing the difference between a helm command signal and a signal representing the movement of the controlled mechanism, i.e., a rudder, diving plane, or other mechanical device. In order to protect against loss of mechanical control as a result of system failure, the system is provided with means for comparing a signal representing the command with a signal representing rate of response by the ram to determine excessive differences therebetween and to warn the helmsman and/or automatically transfer control to another back-up control system. The two signals compared have not, in prior art equipment, been carefully shaped so that they closely match each other for the various positions of the ram as well as for satisfactory rates of follow-up by the ram of the command signal when the system is working properly. As a result, the present systems have a strong tendency to indicate emergency conditions and to transfer control to the back-up system when, in fact, no emergency exists, the failure of the compared signals to correspond with each other being attributable more to their poor wave shapes than to failure of the ram to follow the helm at a satisfactory rate.

It is therefore a principal object of this invention to provide in combination with a control servosystem circuitry to shape the signals representing commands and ram responses so that they can be meaningfully compared to determine adequacy of system performance.

With respect to the comparison signal which is applied to the comparing means to represent electrical commands operating the servo-valve to control the ram, this signal has plural features which should be closely matched to the valve performance. The servo valve is "off" when the spool therein is centered, and the size of its opening varies approximately linearly as the spool is moved off-center in either direction to appropriately drive the ram. When the valve is completely opened in either direction a system saturation condition exists, and therefore the comparison signal representing valve openings should also saturate at the level of the command signal required to fully open the valve. The linear portions of the electrical control signal should have a slope between saturation conditions which slope matches the valve excursions off-center, this slope also representing the rate of ram motion commanded. Moreover, the valve has a dead spot in its center through which the spool can move about 10% of its total motion without any output from the valve. Thus, there are three characteristics to be matched, namely saturation at both extremes, a proper slope between these extremes, and the dead spot in the center of the motion. It is an important object of this invention to provide novel means for matching these three features to the performance characteristics of the hydraulic servo valve.

With respect to the other comparison signal which is applied to the comparing means to represent the actual mechanical response rate of the ram, this signal must be differentiated before it can be compared with the command signal for the following reason. The command signal is, in effect, an error signal whose amplitude represents the magnitude of the command sent to the ram, and therefore it is in the nature of a velocity or rate-of-movement signal. On the other hand the output signal taken from the ram follow-up synchro represents the present position of the ram, rather than its rate of movement. Therefore, this signal is sent through a differentiator so that it, too, becomes a signal representing ram velocity, i.e., rate of ram movement, and these two rates are compared to determine whether the rate of ram movement adequately approaches the commanded ram velocity. However, before the ram position signal taken from the follow-up synchro is differentiated, it should truly represent the position of the ram, so that the signal becomes zero when the ram is centered and varies from a positive to a negative maximum as the ram moves from one hard-over extreme to the other causing the rudder to slew from stop to stop. Unfortunately, the electrical signal coming from the synchro is not linear with ram displacement, but rather has a maximum sensitivity to positional changes in the center and experiences decreasing sensitivity on both sides of center. Therefore, it is a further object of this invention to provide a corrective circuit for shaping the ram-position follow-up signal to make it approximate with adequate accuracy a voltage characteristic which is linear when plotted against mechanical displacement. This corrected signal can then be differentiated to provide a ram follow-up rate signal suitable for comparison with the command signal shaped according to the preceding paragraph.

Other objects and advantages of the invention will become apparent during the following discussion of the drawings, wherein.

Figure 1:
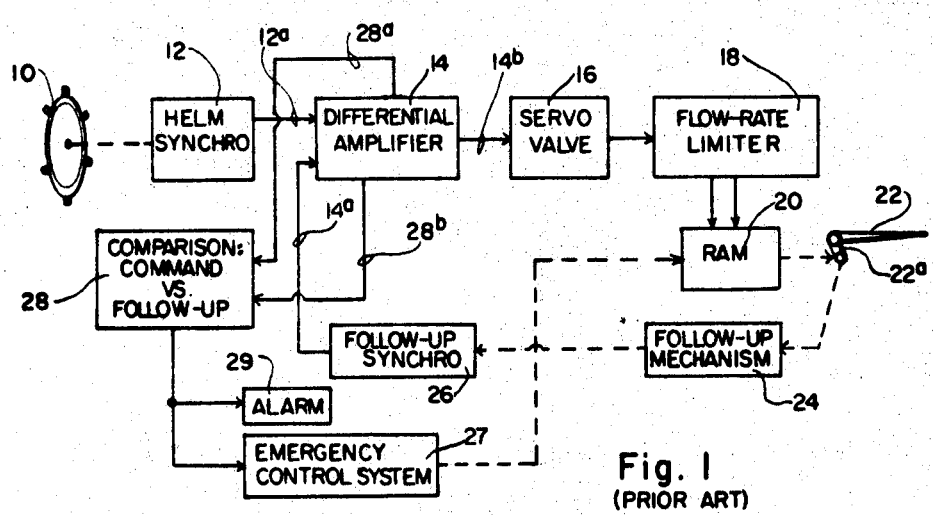
FIG. 1 is a block diagram showing an electrohydraulic servocontrol system of the type discussed in the present illustrative embodiment.
Figure 2:
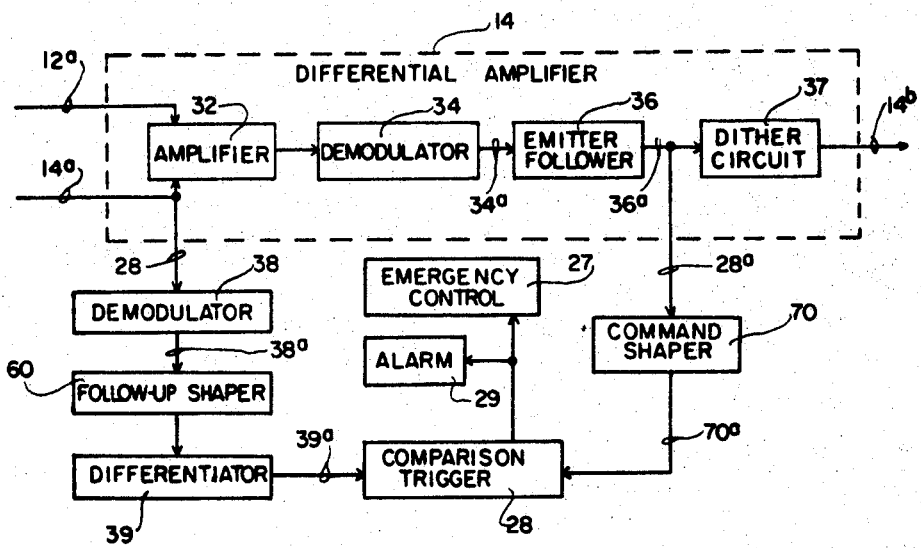
FIG. 2 is a block diagram expanding a portion of the diagram of FIG. 1 and including novel shaper means added according to the present disclosure.
Figure 4:
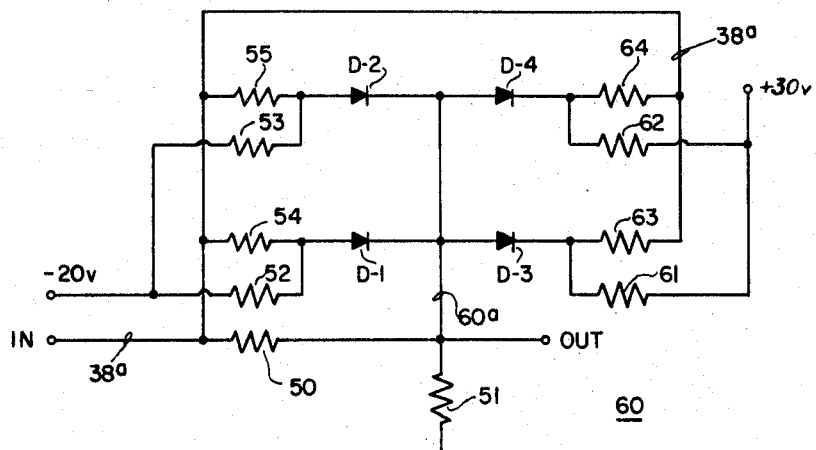
FIG. 4 is a schematic diagram showing a suitable follow-up velocity shaper to correct the linearity of the solid-line curve shown in FIG. 3.
Figure 6:
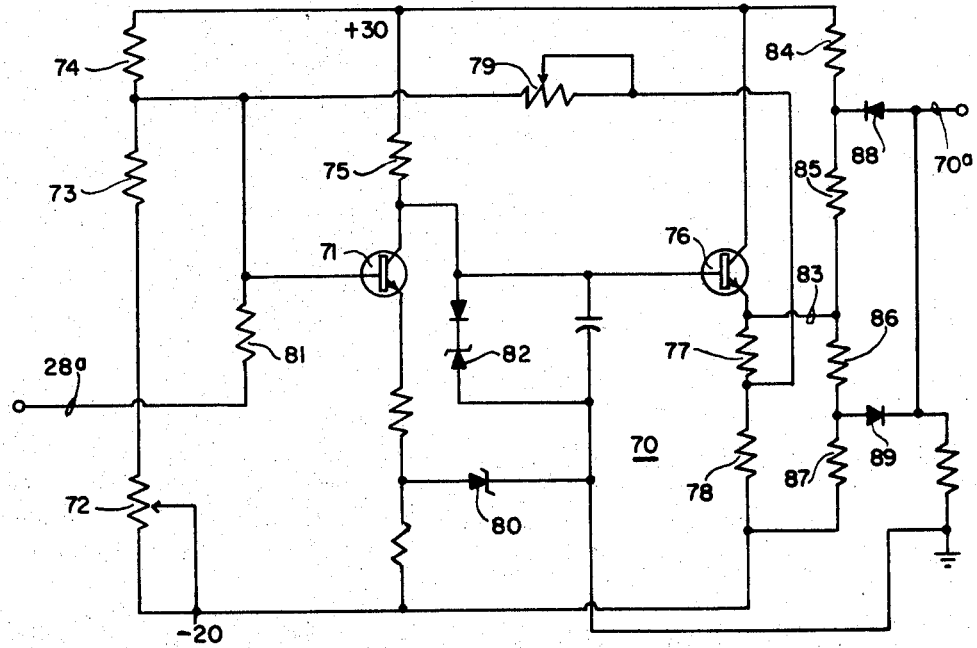
FIG. 6 is a circuit diagram showing a suitable command velocity shaper according to the present invention.

Referring now to FIG. 1, this block diagram shows a rudder control system of the type to which the present improvements, as illustrated in FIGS. 2, 4 and 6 are to be applied. FIG. 1 includes a steering helm 10 connected to drive a helm synchro 12 which delivers a 400 cycle output signal on the lead 12a to the differential amplifier 14. Since this system is a closed loop servo system, the amplifier 14 also has another input on the lead 14a which comprises a feedback signal from the rudder-position follow-up mechanism as will be described hereinafter. The output of the differential amplifier on lead 14b comprises an error signal which drives a servo valve 16 metering the flow of oil through flow-rate limiting means 18 and to a hydraulic ram 20. The ram is mechanically coupled to the rudder 22 through a linkage 22a, reciprocation of the ram 20 causing the rudder to slew between stop limits (not shown) and the flow-rate limiter 18 limiting the maximum hard-over slewing rate. The linkage 22a is also connected to a mechanical follow-up mechanism 24 which converts the motion of the linkage 22a to adjust the angular position of a follow-up synchro 26 which delivers the aforementioned 400 cycle feedback signal on the wire 14a to the differential amplifier. When the error signal on the lead 14b at the output of the differential amplifier 14 goes to zero, the rudder is in the position called for by the helm 10, but if the rudder lags behind the required position, a positive or negative D.C. signal will appear on the error lead 14b, the magnitude of the signal representing the amount of lag error, and the polarity of the signal representing the direction of the error.

Samples representing the command signal and the follow-up signal are taken on leads 28a and 28b, and are delivered to a comparison circuit 28 which compares their relative magnitudes and polarities to determine whether the amount of error is permissible at any particular moment. If the error becomes excessive, the comparison circuit 28 then triggers an alarm 29 to warn the helmsman, and also changes over to an emergency back-up steering system 27 from the electrohydraulic system just described.

The improvements added by the present invention relate to the character of the signals compared in the comparison circuit 28, these signals representing the servo valve command signal and the ram follow-up or feedback signal. Under ideal conditions, these signals would be identical whenever the rudder 22 is moving satisfactorily toward the position actually called for by the helm. However, the system suffers from various non-linearities which distort the signals being compared so that in a practical system they do not actually resemble each other, whereby the emergency and alarm features of the system have a strong tendency to become operative at times when they are not really required. Attempts to reduce the incidence of such pseudo-emergency conditions by rendering the system less sensitive proved ineffective, and therefore the improvements described hereinafter have been made for the purpose of making the signals representing servo valve commands match the signals representing the ram follow-up signal for all conditions in which the rudder has followed the helm command reasonably accurately and promptly.

Referring now to FIG. 2, this figure is a block diagram showing more detail within the differential amplifier block 14 and showing the comparison circuit 28, both of which appear also in FIG. 1. This disclosure adds to these units novel shaping circuits designed to improve the reliability of operation of the system. The differential amplifier 14 has two inputs 12a and 14a, both being 400 cycle signals taken respectively from the helm synchro 12 and the follow-up synchro 26 and comprising command and follow-up feedback signals. These signals are algebraically combined in an amplifier 32 to produce a resultant 400 cycle signal representing the degree to which these input signals differ. The output of amplifier 32 is then demodulated in the demodulator 34, the output of the latter comprising a D.C. error signal on the wire 34a. This D.C. signal is amplified by an emitter-follower circuit 36 which delivers a direct current signal on lead 36a which varies approximately inversely linearly according to the extent of the correlation between the command signal on wire 12a and the feedback signal on the wire 14a. If the two are in agreement, the rudder and the helm are properly mutually positioned and the output on lead 36a will be zero, meaning that no error exists. On the other hand, if there is a disagreement, the D.C. level appearing on wire 36a will be either positive or negative depending upon the sense of the error, and the amplitude of the D.C. voltage on wire 36a will represent the magnitude of the error, which is therefore proportional to the rate at which the rudder should be slewed in order to eliminate the error. It is important to note that the D.C. command output signal on wire 14b directly operates the servo valve, whose spool is centered when the error signal 14b is zero, but whose spool is moved to the left or to the right to appropriately change the position of the ram 20, depending on the polarity of the error voltage 14b and at a rate depending upon its magnitude. Thus, a large error signal on lead 14b opens the valve 16 quite far and causes a high rate of oil flow, causing a high velocity of movement of the rudder. A sample of the command signal is taken on the wire 28a representing the velocity of the correction command, for the reasons set forth above, and this signal is shaped in a command signal shaper 70 which will be described hereinafter and delivered to the comparison circuit 28 as one of its two inputs.

The other signal input which is compared with the shaped output of the shaper 70 to determined whether or not an emergency condition exists must also represent a rate, i.e., velocity of follow-up. Since the magnitude of the above-mentioned signal appearing on the wire 28a represents the velocity at which the rudder is being commanded to move, it is necessary that the signal with which it is compared represent the velocity at which the rudder is actually following the command. For this purpose a 400 cycle signal is taken from the feedback wire 14a, and this signal is first demodulated by the demodulator 38 to produce a varying D.C. voltage on the wire 38a which voltage represents the momentary position of the rudder. Since the signal which is used for comparison purposes must represents the velocity of movement of the rudder rather than its position, it is necessary to differentiate the output of the demodulator 38 in a differentiator 39, and then to apply this signal to the second input of the comparison trigger 28. Ideally, the signal applied at the lead 39a should be a linear signal which goes either positive or negative depending upon the direction of lag by the rudder, and it should be linearly related to the velocity of actual motion of the rudder as it is being slewed. If both of the signals being introduced for comparison by the wires 39a and 70a were truly linear as described above, their comparison would be easy since they would represent, respectively, actual movement rate of the rudder and rate called for by the error command. Unfortunately, neither signal is linear, and therefore the shapers 60 and 70 must be resorted to.

Follow-up velocity shaper

Figure 3:
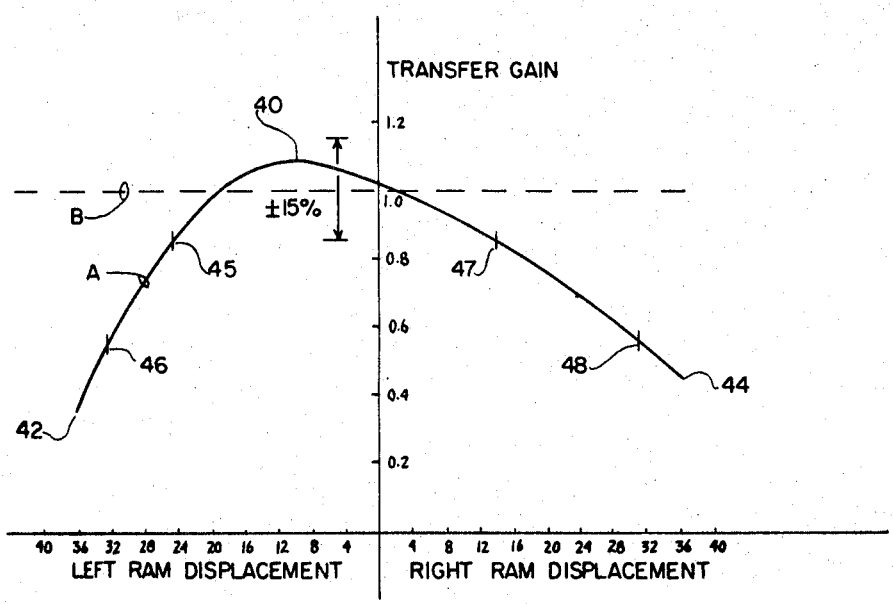
FIG. 3 is a graphical representation showing the desired linear transfer function and indicating the gain of the unimproved electrical system plotted against ram displacement.

The problem causing the non-linearities in the follow-up ram-rate signal on lead 38a can be demonstrated with reference to the graph of FIG. 3 which shows actual displacement of the ram in terms of rudder displacement in degrees from left to right through the center position, plotted against transfer gain of the over-all synchro 26 and linkages, and demodulator 38 circuits. Taking the center point of the curve A as unity gain, it will be observed that a transfer gain maximum for the error signal occurs when the rudder is in the 10° left position, and that the transfer gain of the system decreases on both sides thereof, meaning that the sensitivity of the system falls off on both sides of this 10° point labeled 40 in FIG. 3. An ideal system would be realized when the transfer gain of the system remained constant as shown in characteristic B over the entire sweep of the rudder to both sides of center. If this were accomplished, then the output of the demodulator 38 would be zero in the center and would vary linearly on both sides of center to maximum negative and positive values at the extreme rudder positions 42 and 44.

In order to correct the curve A to approximate the characteristic B the present invention provides a velocity shaper 60 as shown in FIG. 4. This shaper circuit receives the signal on wire 38a and delivers an output on wire 60a which is more nearly linear with respect to the rudder position, i.e., within 15% in the present exemplary illustration. The input signal on wire 38a varies between plus 9.6 volts and minus 11 volts. This input voltage is divided by a factor of approximately .3 by the voltage divider including resistors 50 and 51. The diodes D1, D2, D3 and D4 are biased so that they are normally non-conductive, but as the voltage increases on the output wire 60a the diodes will progressively break down and insert selected ones of the resistances 54, 55, 63 and 64 into the voltage divider in parallel with resistor 50 to change the circuit's transfer function. For instance, with the bottom of resistor 51 grounded, the left ends of the diodes D1 and D2 are back-biased from a minus 20 volt source through resistors 52 and 53. If the input is positive on terminal 38a, as it increases in the positive direction, the left end of diode D1 will become increasingly positive until it overcomes the negative bias applied through resistor 52, and at this time the resistor 54 will be added across the voltage divider resistor 50, thereby increasing the over-all transfer function, and raising the level of the curve A in FIG. 4 at the point labeled 45 and at all points to the left thereof, whereat the input voltage is more positive than the value necessary to render diode D1 conductive. When the input voltage on wire 38a has reached a second point in the positive scale where its level is sufficient when applied through the resistor 55 to overcome the negative bias applied by resistor 53 to the left end of diode D2, then the resistor 55 will be placed in parallel with resistors 54 and 50 to further increase the transfer function of the input signal level to the shaper 60 as shown at point 46 in FIG. 4. Here again, the circuit parameter values have been selected such that the non-linearity of the synchro demodulator circuit never exceeds 15%.

On the other hand, if the input on wire 38a is negative, diodes D3 and D4 will successively become operative to increase the circuit's transfer function. The right hand ends of the diodes D3 and D4 are back-biased by a positive bias of 30 volts applied thereto through the resistors 61 and 62. As the input voltage on the wire 38a increases in the negative direction, the voltage on the right hand end of diode D3 will eventually exceed the positive bias applied thereto. At this time the diode D3 will become conductive and inserts the resistance 63 in parallel with the resistance 50. As the input voltage rises further in the negative direction, eventually the diode D4 will become conductive and insert the resistance 64 in parallel with the resistors 63 and 50 to still further increase the transfer function to the output lead 60a of the input signal on wire 38a. Thus, the curve A in FIG. 3 will be corrected in the direction of the straight line B at points 47 and 48, and as stated above will be held within 15% thereof, which accuracy is satisfactory for present purposes.

*Command shaper*

The command signal on wire 28 comprises a D.C. level which varies in magnitude according to the size of the error between the input 400 cycle helm command on lead 12a and the ram position feedback on lead 14a, FIG. 2. When these two signals are combined in the amplifier 32 and demodulated in the demodulator 34, the resulting D.C. level appearing on wire 36a has a magnitude representing the intensity of the command and a polarity representing the direction of the command. This D.C. level passes through a dither circuit 37 which merely impresses a jitter on the D.C. level so that when it is applied by the wire 14b to the servo valve 16, the latter will be kept continuously in motion through a small amplitude so as to insure that it will not stick but will accurately follow small commands. As graphically shown in FIG. 5, the command signal on wire 28a is a straight line C, this curve representing intensity of the command in terms of ram velocity signal versus percentage of opening of the servo valve 16. However, the curve D shows the actual ram velocity plotted against magnitude of the servo valve opening. By comparing the curves C and D, it will be seen that, without correction, the ram velocity reaches a maximum when the command signal is at only about half of its amplitude. Thus, the correlation between the two curves is not very good. More gain is required in amplifying the command signal on wire 28a so as to make the slope of the curve C approach the slope of the nearly vertical portions of curve D, and means is also desirable for causing curve C to saturate after it has actuated the servo valve sufficiently to obtain full ram velocity.

The circuit shown in FIG. 6 is used to accomplish this and other purposes by changing the command signal curve C to follow the dashed curve E. It is also interesting to note that the ram velocity curve D does not pass through the origin of the graph, but instead has a dead spot covering the center 10% of the servo valve movement. This is a characteristic of the servo valve, namely that the spool within it can move about 10% in the center region without delivering any oil from the valve to the ram. It is desirable to have the dashed curve E follow this 10% dead spot since it is the purpose of the present shaper to provide close correlation between the signals representing commands and those representing actual performance of the system.

The command shaper circuit as shown in FIG. 6 includes an input on the wire 28a and an output on the wire 70a. This system comprises an amplifier transistor 71 receiving the input signal on its base which is biased by a chain of resistors 72, 73 and 74. Output of the amplifier transistor 71 appears across the resistor 75 and is direct-coupled to the base of an emitter-follower transistor 76. Part of the output of the emitter-follower is taken between resistors 77 and 78, and provides an inverse feedback signal coupled through the potentiometer 79 to the base of the amplifier transistor 71. The amount of inverse feedback is selectable by adjusting potentiometer 79 in order to alter the gain of the amplifier to provide the best match of the slope of the curve E with the curve D in FIG. 5, i.e. along dashed curve E.

Figure 5:
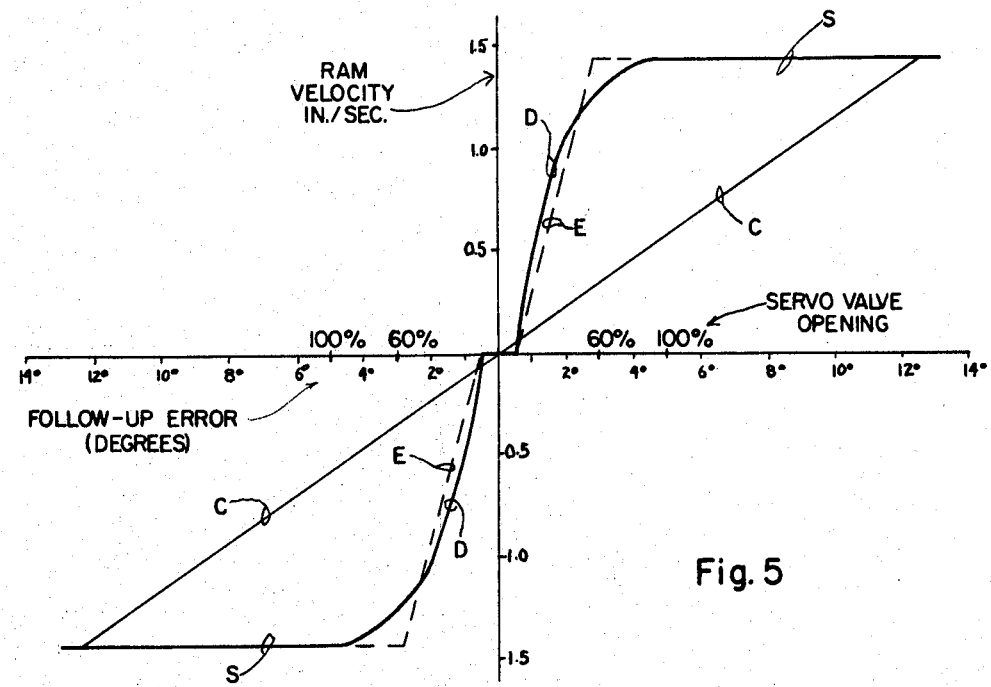
FIG. 5 is a graphical illustration showing servo valve and ram response in terms of ram velocity plotted against servo valve opening, and showing command velocity signals before and after shaping.

As pointed out above, it is also desirable to have both the positive and negative maxima of the amplifier 71 saturate at the levels S in FIG. 5. For this purpose, Zener diodes are used, including a Zener diode 80 in the emitter circuit of the transistor 71. This Zener diode 80 determines the maximum negative bias of the emitter of transistor 71 such that when the signal applied on wire 28a reaches a certain positive value required to turn the transistor 71 completely "on," the emitter of 71 will hold at this bias. The collector of 71 will hold at the same value, and a greater base signal will be prevented from driving the transistor 71 any further. Likewise, a Zener diode 82 is provided in the collector circuit of the transistor amplifier 71 such that upon a given negative input signal at the base of the transistor 71, the output level of its collector cannot rise above the Zener diode voltage, thereby limiting the positive swing of the signal applied to the emitter-follower amplifier 76. These two Zener diodes 80 and 82 provide sharp saturation characteristics as shown by the knees of curves E at S in FIG. 5.

The output of the emitter-follower amplifier 76 on lead 83 would normally follow the slope of the curve E, but additional circuitry has been added to provide the desired 10% dead spot M in the middle of curve E. The dead spot is provided by the resistor chains 84, 85, 86 and 87 and by the two diodes 88 and 89. The diode 88 is positively biased on its left end by the resistor 84 to a level equal to 5% of the curve, or half of the required dead spot. Conversely, the left end of the diode 89 is negatively biased by the resistor 87 to provide a 5% threshold above which the signal on wire 84 must go in the positive direction in order to have it exceed the threshold and pass through the diode 89. These two diodes therefore provide the dead spot M in the middle of the curve E.

As a result of the above shaping of the curve E to match the actual performance of the servo valve and ram driving the rudder, a realistic curve E is provided which can be inserted via the wire 70a into the comparison circuit 28, for comparison with the ram rate signal curve inserted into the comparison circuit 28 on the wire 39a, FIG. 2. The latter signal is also a realistic signal closely following the actual performance of the ram 20, and therefore the two input signals to the comparison circuit 28 can be properly compared with each other to determine the actual rate at which the rudder ram is following the helm. Trigger means is provided in the comparison circuit 28 such that if the rate of motion of the rudder ram does not check closely with the rate called for by the command, an alarm will be sounded by the alarm circuit 29, and the emergency control circuit 27 will be activated to substitute a back-up rudder control system for the one presently under discussion.

I claim:

1. In a servosystem having mechanical actuator means for positioning a mechanical device according to a command, the system including command-signal generating means, device-displacement follow-up signal generating means, differential amplifier means for receiving said generated signals and developing an error signal whose amplitude and sign represent the magnitude and sense of any error of the device in following the command, the error signal being connected to control the rate and direction of said actuator means, and the system further including means for differentiating the follow-up signal, and means for comparing the resulting signal with the error signal to determine whether said device is following said command at a satisfactory rate, the improvement comprising (a) first shaper means coupling said follow-up signal to the differentiating means and operative to shape the follow-up signal to make its amplitude vary substantially linearly with displacement of said device; and (b) second shaper means coupling said error signal to said comparing means and operative to shape the error signal to make its amplitude vary substantially linearly with the operative effect of the error signal upon said actuator means.

2. In a system as set forth in claim 1, said device-displacement follow-up signal generating means comprising a follow-up synchro coupled for movement with said displacement, the amplitude of the follow-up signal being non-linearly related to the actual displacement, and the first shaper means including compensating means for making the amplitude of the shaper output vary substantially linearly with said actual displacement.

3. In a system as set forth in claim 2, said first shaper means including a network of impedance elements and diodes whose transfer function varies with input voltage level, and sources of positive and negative bias voltages, certain of said impedance elements being connected to form a voltage divider, and others of said elements being coupled through diodes in parallel with said certain elements, and the coupling diodes being back-biased to graduated degrees by said bias voltages, the input signal selectively overcoming said back-biases according to its instantaneous voltage level.

4. In a system as set forth in claim 1, said actuator means comprising a ram and a servo valve having an output in control of said ram and in turn connected for control by said error signal, the amplitude of the error signal being non-linearly related to the resulting displacement of the ram, and the second shaper including compensating means for making its shaped output amplitude vary substantially linearly with the variation in output of the servo valve.

5. In a system as set forth in claim 4, the shaper means including means for varying the gain between its input and its output to adjust the slope of its linear output to the slope of the ram response.

6. In a system as set forth in claim 5, said second shaper means including amplifier means having degenerative feedback connected across it, and means for adjusting the amount of inverse feedback to adjust the gain of the amplifier means.

7. In a system as set forth in claim 4, said servo valve having maximum effective openings near both extremes of its motion beyond which no greater velocity of movement of the ram occurs, and said second shaper means including means for saturating its own output signals for input error signals to it representing said maximum openings of the valve.

8. In a system as set forth in claim 7, said second shaper means including amplifier means, sources of positive and negative bias voltages, and Zener diode means connected with the amplifier means and biased by said voltages to limit the maximum positive and negative swings of its output.

9. In a system as set forth in claim 4, said servo valve having a dead spot in the middle of its motion within the limits of which displacement of the valve produces no output to the ram, and said second shaper means including means for developing zero output from the second shaper means for input error signals to it representing motions of the valve within said dead spot.

10. In a system as set forth in claim 9, said second shaper means including amplifier means, sources of positive and negative bias voltages, and diode means connected to the amplifier means and biased by said voltages to provide thresholds symmetrically operative about the zero signal level of the amplifier means within which threshold its output remains zero.

References Cited

UNITED STATES PATENTS

| 2,496,391 | 2/1950 | Hall | 91—364 |
| 2,829,322 | 4/1958 | Silva | 318—20.050 |
| 3,032,015 | 5/1962 | Weinstock | 91—364 |

FOREIGN PATENTS

| 201,301 | 1/1966 | Sweden. |
| 728,016 | 2/1966 | Canada. |

PAUL E. MASLOUSKY, *Primary Examiner.*